Feb. 22, 1944. H. D. TAYLOR 2,342,502
DYNAMO-ELECTRIC MACHINE
Filed Oct. 25, 1941
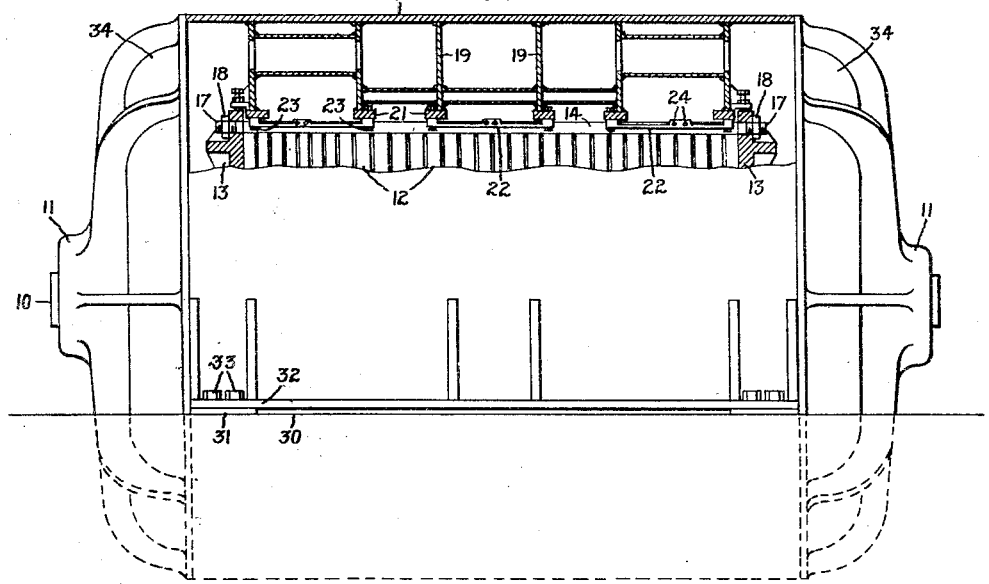
Inventor:
Hamilton D. Taylor,
by Harry E. Dunham
His Attorney.

Patented Feb. 22, 1944

2,342,502

UNITED STATES PATENT OFFICE 2,342,502

DYNAMOELECTRIC MACHINE

Hamilton D. Taylor, Niskayuna, N. Y., assignor to General Electric Company, a corporation of New York Application October 25, 1941, Serial No. 416,498

5 Claims. (Cl. 171—252)

My invention relates to improvements in dynamo-electric machines, and particularly to an arrangement for minizing the effect on the support of such machines of electromagnetic distortions and vibrations produced by a rotating magnetic field in such machines.

In certain types of dynamo-electric machines, considerable vibration may be set up in the stationary member of the machine by electromagnetic distortions which are created by the rotating magnetic field set up either by the rotatable member of the machine or by currents in a stationary member winding. This is particularly noticeable in two pole machines wherein the rotatable member is excited to provide two magnetic poles which rotate within a stationary member formed of magnetic material. The magnetic attractive force of the rotor is proportional to the square of the flux density, and is always positive. This magnetic attractive force tends to pull the stator radially inwardly and to distort the stator substantially into an elliptical form, and this deformation rotates about the stationary member producing two cycles of vibration at any fixed point thereon for each revolution of the rotor. If these vibrations are transmitted through the stationary member to the supporting foundation, the foundation and other equipment supported thereby may be subjected to undesirable vibratory forces and noise. The stationary member of such a machine usually is provided with a laminated core in which the armature winding is arranged, and this assembly is mounted within a stationary supporting frame. It generally has been accepted that if the stiffness of the stationary member can be increased, the distortion thereof due to the rotating magnetic field may be reduced correspondingly. It has been found, however, that the rigid connection between the laminated core and the supporting frame does not provide an element having a deep beam stiffness, but rather the effect of a combination of two beams, one above the other, so that the resultant stiffness is merely the sum of the stiffness of the two elements. By actual tests, it has been found that the stiffness of a conventional laminated core in this type machine may be seven or more times that of a supporting frame, and, therefore, the stiffening of the frame adds relatively little to the resultant stiffness of the stationary member of the machine.

In order to minimize the transmission of vibrations which are produced by the deformation of the laminated core of a stationary member in this type of machine, a plurality of flexible beam springs is arranged for flexibly supporting the core upon the stationary supporting frame. This is not my invention, but is the invention of Lloyd P. Grobel, and is disclosed and claimed in his Patent No. 2,199,156, April 30, 1940, and assigned to the same assignee as this application. These supporting springs are arranged to allow only relatively small deflections of the core due to the weight thereof, and also should avoid torsional resonance with any pulsating torques which may occur due to short circuits or operation with unbalanced phase loads. It has been found that with two pole machines of this type, the stationary core vibrates with a four-node vibration which is not entirely radial, but that the instantaneous nodal points on the outer periphery of the core have tangential displacements equal to about one-half or less of the maximum radial displacements thereof. By supporting the laminated core within the stationary supporting frame on a flexible support which provides both radial and tangential flexibility, very little vibration will be transmitted to the stationary supporting frame, so that the transmission of magnetic vibratory forces to the foundation of the machine and noises incident thereto are reduced. This construction is described and claimed in my Patent No. 2,199,351, April 30, 1940. In certain instances I have found that when the stationary frame member is rigidly secured along its entire length to the supporting foundation, the foundation and the frame may interact in such a manner as to produce combined natural periods of vibration different from the natural period of the frame itself. This may create undesirable resonant conditions which may set up appreciable vibration of the machine frame and the foundation.

An object of my invention is to provide a dynamo-electric machine having an improved arrangement for supporting a stator core within a stator frame and the frame on a foundation.

Another object of my invention is to provide an improved support for a magnetic core subjected to vibratory forces to minimize the transmission of such forces from the core to the frame and the frame supports.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a side elevational view, partly broken away, of a dynamo-electric machine embodying my improved supporting arrangement; and Fig. 2 is an end view, partly broken away, of the machine shown in Fig. 1.

Referring to the drawing, I have shown my invention in connection with a dynamo-electric machine having a rotatable member supported by a shaft 10. The rotatable member shaft is supported by pedestal bearings mounted in bearing housings 11 arranged at each end of the machine. The rotatable member is provided with a magnetic core and an exciting winding, and is arranged to react electro-dynamically with the stationary member, which is provided with an armature winding supported in a laminated core of magnetic material mounted in a stationary supporting frame. The laminated core includes a plurality of laminations 12 which is secured in assembled relation between end plates 13 at each end thereof and drawn together by a plurality of clamping bars 14. A plurality of these bars is arranged in circumferentially spaced apart relation about the periphery of the laminated core, and each bar is formed with a groove 15 into which is secured a dovetail key 16 which also is fitted into a dovetail groove in the outer edge of the laminations 12. The outer ends 17 of the clamping bars 14 are threaded and extend through openings formed in the end plates 13, so that the clamping pressure on the core may be adjusted to provide the desired stiffness to the core. This pressure should be such that no substantial displacement occurs between adjacent laminations due to the electromagnetic distortion of the core in order to prevent chafing of the insulation on the armature winding arranged in the slots of this core. The clamping pressure between the two end plates 13 may be varied by adjusting nuts 18 which engage the threaded ends 17 of the clamping bars 14.

The assembled core is adapted to be supported in a substantially rigid stationary supporting frame which includes a plurality of annular supporting and stiffening plates 19 arranged in longitudinally spaced apart relation and secured within an outer wrapper plate 20. A ring 21 welded to the inner edge of each of the plates 19 and a plurality of beam springs 22 is arranged in longitudinally spaced apart sets and circumferentially spaced apart relation about the laminated core in each of these sets to provide a flexible support which is substantially rigid longitudinally of the stationary member. To provide this support the beam springs 22 are arranged in pairs, one on each side of a bar 14 and are formed with an enlarged portion adjacent each end and adjacent the central portion thereof and are secured adjacent the ends thereof to the supporting rings 21 by bolts 23 which extend through the enlarged ends, and are secured adjacent the central portion thereof to the bars 14 by bolts 24, which extend through the enlarged central portion of the springs and through the clamping bars 14. A spacing block 25 is arranged between each of the springs 22 and the adjacent clamping bar 14 to provide a slight clearance between the spring and the bar to allow for slight tangential flexing of the springs 22 without resulting in contact between the springs and the bars 14. In order to provide the desired radial and tangential flexibility to the supporting arrangement, the beam springs 22 are constructed so that their flexibility is substantially greater in a radial direction than in a tangential or circumferential direction with respect to the laminated core. This is obtained by making the springs 22 substantially wider in a tangential direction than they are deep in a radial direction. The relative flexibility of the spring supporting arrangement in the tangential and radial directions is not my invention, but is the invention of Chester W. Rice, and forms the subject of his Patent No. 2,199,141, April 30, 1940, assigned to the same assignee as this application. This arrangement of flexible springs provides a support for the laminated core which is substantially rigid longitudinally thereof and flexible radially and tangentially thereof, with radial flexibility which may be substantially greater than the tangential flexibility of the support. Furthermore, it allows for slight tangential and radial displacements of the laminated core within the stationary supporting arrangement, so that very little vibration is transmitted to the supporting frame.

It has been found that the deformation of the core of such a machine is substantially greater adjacent the central portion thereof than at the ends thereof, and in certain instances, the displacement at the ends of the core is negligibly small. It, therefore, is not necessary in all instances to support flexibly the outer ends of the laminated core. In order to provide a rigid support between the core and the frame adjacent the ends thereof, adjustable stop or limit screws 26 threadedly engage openings in stop plates 27 which are rigidly welded to the outer sides of the outer stiffening plates 19 adjacent the inner edge thereof. Gusset plates 28 are welded to the stop plates 27 and to the outer surface of the outer stiffening plates 19 to provide a more rigid connection between the stops 27 and the plates 20. A plurality of these limit screws 26 and stop plates 27 is arranged in circumferentially spaced apart relation about the inner edge of each of the outer stiffening plates 19. The limit screws 26 are adjusted in relation to the stop plates 27 and the outer edge of the end plates 13 so as to provide a rigid support for the end plates 13 and the laminated core 12 on the outer stiffening plates 19. A lock nut 29 threadedly engages each limit screw 26 to insure against accidental loosening after it has been adjusted to provide the desired rigid support for the end plate 13. In this manner, the outer ends of the laminated core of the stationary member of the dynamo-electric machine may be rigidly supported upon the frame of the stationary member and the beam springs 22 flexibly support the remainder of the core on the stationary member supporting frame. This construction is described and claimed in my Patent No. 2,199,351, April 30, 1940.

When the core of a machine of this type is flexibly supported, the frame is free to vibrate at its own natural or resonant frequency, and this tendency to vibrate may be stimulated by the vibratory forces transmitted thereto through the flexible supports. It therefore becomes of importance that the frame shall not amplify the transmitted vibrations, and shall not have a resonant characteristic near that of the normal operating vibration of the core. It also is desirable that the frame resonant or natural frequency should be higher than the transmitted normal operating vibration of the core, so that this frequency will not be passed as the machine accelerates to or decelerates from normal operating speed. In order to insure against undesirable vibrations and noises the natural frequency of the frame for four node vibrations should be substantially different, that is, about twenty or twenty-five per cent or more different from twice normal operating speed of the rotor of the machine. As explained in my above patent, there are four nodes or neutral points on the circumference of the stator which do not tend to move inwardly or outwardly in such a machine. Higher modes of vibration having more than four nodes may occur, but the natural frequencies for these higher modes are materially higher than for four nodes, and hence are not within the range of resonance unless the four node natural frequency is substantially below twice the operating speed. Thus, it is particularly important that the four node natural period of vibration of the frame shall be materially different from and preferably higher than twice the operating speed of the machine. Even with such a machine, I have found that when the frame is rigidly secured along substantially its entire length to a supporting foundation, the frame and the foundation may vibrate together with a different natural period of vibration than that of the frame alone. The new natural period may be either higher or lower than that of the frame alone, and in certain instances both may occur. Thus, a new natural period of vibration may be closer to twice the operating speed of the machine, and in such a case, the resulting amplification may cause vibrations of a very undesirable amplitude. In order to overcome objectionable vibration of the frame and foundation from this cause, I provide a foundation 30 for supporting the frame of the machine, and arrange shims or mounting plates 31 under the supporting feet 32 of the machine adjacent the four outer corners thereof. The frame of the machine is rigidly bolted to the foundation by bolts 33 which extend through the shims 31 and into the foundation 30. This provides a substantially rigid support for the frame at substantially only the outer longitudinal ends thereof adjacent the four outer corners of the machine. I have found that since the machine frame is materially stiffer at its outer ends due to the rigidity of end shields 34, the vibration at the ends of the machine also is very much less than the vibration of the central portion of the frame. By thus supporting the frame on the foundation only at the ends of the machine, the changed natural period of vibration of the machine frame, when secured to the foundation, is minimized, so that the design value for the natural period of the frame can be closely realized, and the full effectiveness of the flexible mounting is obtained.

While I have illustrated and described a particular embodiment of my invention, modifications thereof may occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A dynamo-electric machine having a rotatable member and a stationary member, said stationary member being provided with a frame and a core arranged within said frame, said frame being substantially more rigid at its outer ends than intermediate the ends thereof, means for supporting said core in said frame substantially rigidly longitudinally thereof, said supporting means being flexible substantially radially and tangentially of said core, and means for substantially rigidly supporting said frame only adjacent the outer substantially more rigid longitudinal ends thereof.

2. A dynamo-electric machine having a rotatable member and a stationary member, said stationary member being provided with a frame and a core arranged within said frame, said frame being substantially more rigid at its outer ends than intermediate the ends thereof, means flexible radially of said core for supporting said core in said frame, means adjacent an end of said core for rigidly supporting said end of said core in said frame, and means for substantially rigidly supporting said frame only adjacent the outer substantially more rigid longitudinal ends thereof.

3. A dynamo-electric machine having a rotatable member and a stationary member, said stationary member including a frame having a four node natural period of vibration substantially different from twice the normal operating speed of said rotatable member being substantially more rigid at its outer ends than intermediate the ends thereof, a core arranged within said frame, means for flexibly supporting said core in said frame and providing a substantially rigid support longitudinally thereof, and means for substantially rigidly supporting said frame only adjacent the outer substantially more rigid longitudinal ends thereof.

4. A dynamo-electric machine having a rotatable member and a stationary member, said stationary member including a frame having a four node natural period of vibration substantially higher than twice the normal operating speed of said rotatable member, a core arranged within said frame, means for flexibly supporting said core in said frame and providing a substantially rigid support longitudinally thereof, a foundation, and means for substantially rigidly supporting said frame on said foundation only adjacent the outer longitudinal ends of said frame.

5. A dynamo-electric machine having a rotatable member and a stationary member, said stationary member being provided with a frame and a core arranged within said frame, means including beam springs extending longitudinally of said core and arranged at circumferentially spaced apart points for flexibly supporting said core in said frame, and means for substantially rigidly supporting said frame only adjacent the outer longitudinal ends thereof.

HAMILTON D. TAYLOR.